United States Patent [19]

Knight

[11] Patent Number: 4,716,675
[45] Date of Patent: Jan. 5, 1988

[54] EXTERNALLY ENGAGING SWALLOW-RESISTANT FISHHOOKS

[76] Inventor: Charley R. Knight, Rte. 1, Box 135-D, Oroville, Wash. 98844

[21] Appl. No.: 2,103

[22] Filed: Jan. 12, 1987

[51] Int. Cl.[4] .............................................. A01K 83/00
[52] U.S. Cl. ......................................................... 43/37
[58] Field of Search ............................ 43/38, 89, 34, 36

[56] References Cited

U.S. PATENT DOCUMENTS

| | | | |
|---|---|---|---|
| 2,149,062 | 2/1939 | Maurer | 43/89 |
| 2,620,590 | 12/1952 | Shaw | 43/89 |
| 2,873,548 | 2/1959 | Reeder | 43/37 |
| 2,881,550 | 4/1959 | Newkirk | 43/44.6 |
| 3,492,752 | 2/1970 | Viveiros | 43/36 |
| 3,727,340 | 4/1973 | Harris | 43/43.2 |
| 3,995,391 | 12/1976 | Bohannon | 43/37 |
| 4,384,426 | 5/1983 | Steeve | 43/43.4 |
| 4,638,591 | 1/1987 | Neumann | 43/34 |

FOREIGN PATENT DOCUMENTS

| | | | |
|---|---|---|---|
| 1138807 | 6/1957 | France | 43/89 |
| 1135 | of 1859 | United Kingdom | 43/89 |

*Primary Examiner*—Gene P. Crosby
*Attorney, Agent, or Firm*—Wells, St. John & Roberts

[57] ABSTRACT

A fishhook for hooking fish upon the outside of their bodies, particularly in the soft tissue behind the fish's lip. The fishhook comprises two or more elongate members with external hooks at distal ends. Proximate ends of the elongate members are connected. A contraction linkage mounts a bait hook or other bait which is pulled upon by the fish to contract the external hooks into the fish's snout.

2 Claims, 7 Drawing Figures

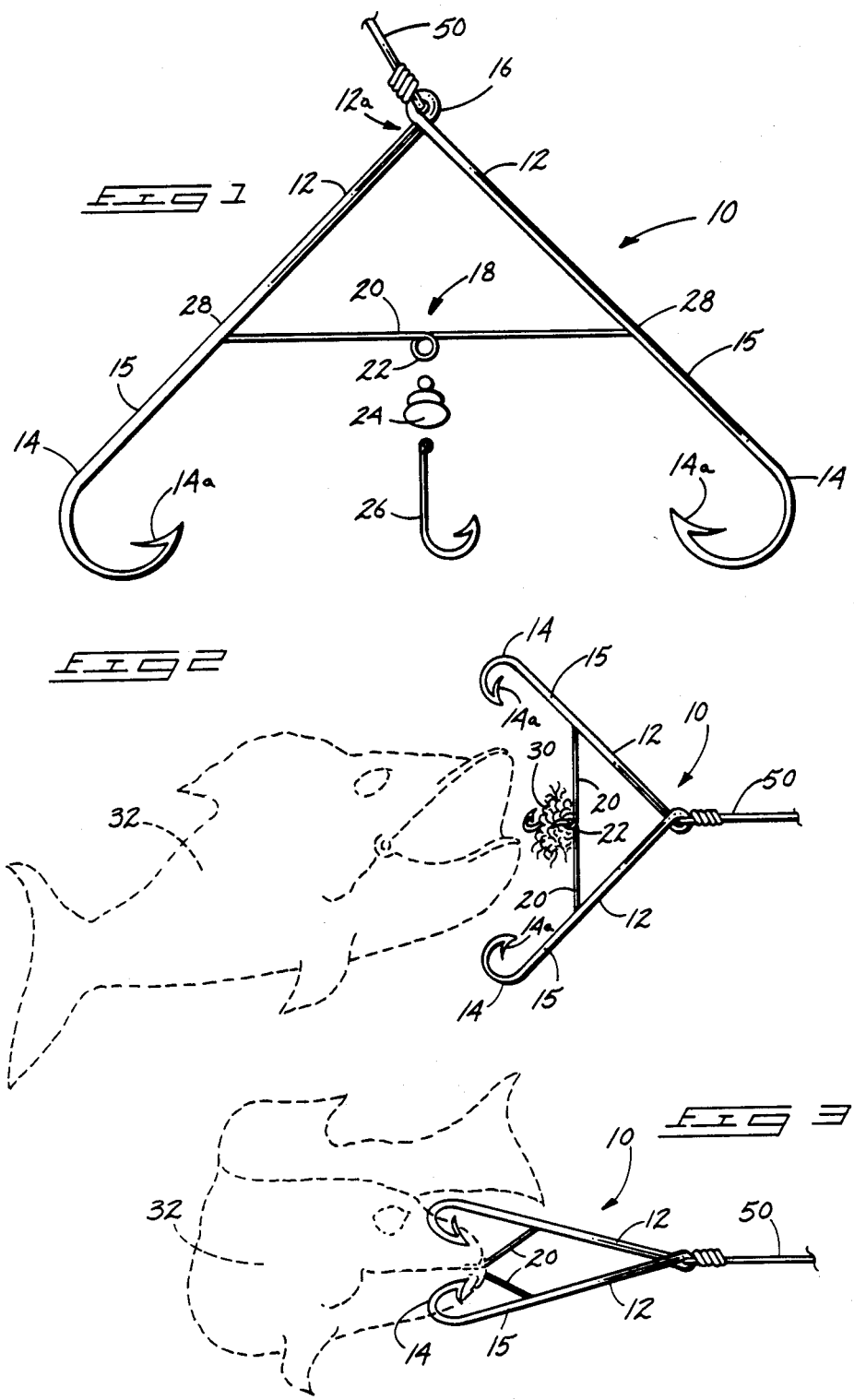

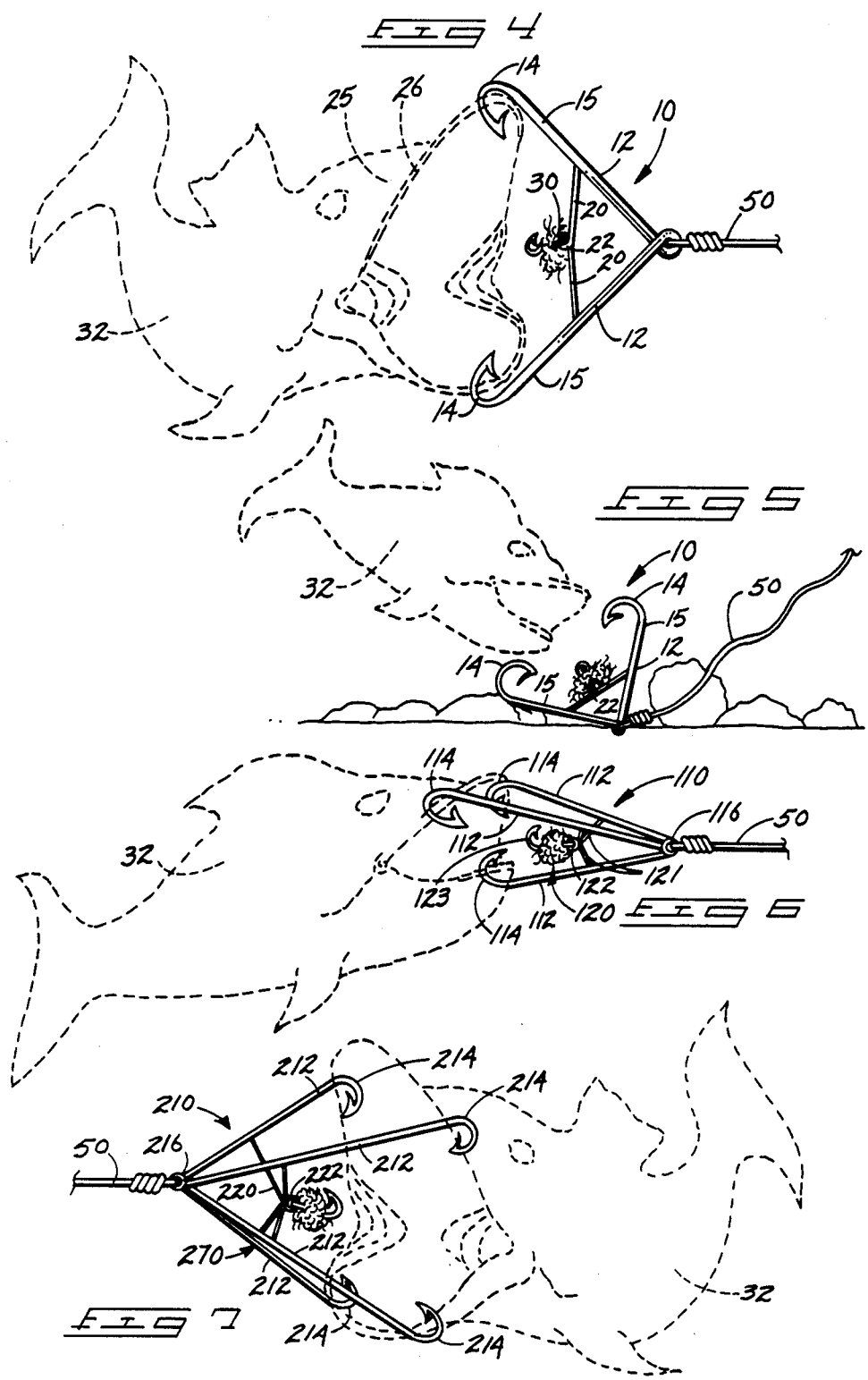

EXTERNALLY ENGAGING SWALLOW-RESISTANT FISHHOOKS

TECHNICAL FIELD OF THE INVENTION

This invention relates generally to fishhooks, and more particularly to fishhooks that are easily removed from a fish after catching.

BACKGROUND OF THE INVENTION

Most states have rigid laws concerning the minimum size of fish a fisherman can keep. Fish caught that are under the minimum size must be released back into the water. Additionally, many fisherman today have adopted the "catch and release" philosophy of fishing, where all fish caught are released for catching at another time thus preserving the fish population.

It is important when catching and releasing a fish that the fishhook be removed from the mouth without causing irreparable damage which kills the fish. When the hook is lodged near the opening of the fish mouth, removal is relatively easy and the fish can be released with minor injuries from which the fish recovers. However, at times, a fish will swallow the hook causing it to be set deep in the gills, throat or stomach. It is usually difficult and often impossible to remove such a deeply set hook without fatally injuring the fish. Accordingly, a fish which swallows a hook usually dies when released back into the water.

A number of fishhooks have been developed which are adapted to engage the fish in the internal portion of the fish mouth or throat as the fish swallows the hook. For example, U.S. Pat. No. 3,727,340 to Harris discloses a fishhook having four hooks connected together at the shanks with the hooks arranged in pairs. The Harris fishhook is adapted to extend the individual hooks outwardly when bitten upon by the fish. The hooks project outwardly to engage inside surfaces of the fish's mouth and throat. U.S. Pat. No. 4,384,426 to Steeve discloses another fishhook similar to Harris having a plurality of hooks which project outwardly as a fish contracts the assembly with its mouth. Both the Harris and Steeve fishhooks are primarily directed to providing a fishhook which does not snag weeds and other debris.

U.S. Pat. No. 3,492,752 to Viveiros discloses a fish hook which includes two hooks or a hook and another part which are spring loaded relative to each other prior to fishing. The hooks spring outwardly when bitten by a fish. The hooks are biased outwardly to hook the fish inside its mouth.

U.S. Pat. No. 2,881,550 to Newkirk discloses a live bait holder and hook device. The device includes two hooks pivotally connected at the shank ends in opposing relationship. A minnow or other live bait is positioned between the oppositely directed hooks and secured therein using a specially formed elastic member which is looped over both the minnow's tail and head, and also looped about the shanks of the hooks. When struck, the device causes the hook points to extend outwardly to engage inside surfaces of the fish's mouth and throat.

The prior art fishhooks discussed above all function to hook the fish from inside the mouth, throat and gills. Such designs do not prevent the serious injuries suffered by fish who swallow hooks. Instead each reference provides a plurality of hooks which cause even more serious damage and greatly complicate the job of the fisherman. Such prior art fishhooks require the fisherman to extract 2, 3 or 4 hooks using the skill of a surgeon in order to prevent serious or fatal injury to the fish. Accordingly, there remains a need for a fishhook which is not swallowed by a fish and which is inexpensive to construct. It is also desirable to have a fishhook adapted to engage a fish along outer portions of the fish's snout, thus allowing easy hook removal and only minimal injury to the relatively tough tissue existing on outer portions of the fish's head.

BRIEF DESCRIPTION OF THE DRAWINGS

FIG. 1 is an exploded perspective view of a preferred embodiment of the improved fishhook in accordance with the invention;

FIG. 2 is a side view of the fishhook of FIG. 1 shown with a phantom fish about to strike the bait hook;

FIG. 3 is a side view of the fishhook of FIG. 1 shows after being struck by a fish with outer hooks engaging outer surfaces of the fish's snout;

FIG. 4 is a perspective view of the fishhook of FIGS. 1-3 engaged by the fish, with the fish unsuccessfully attempting to free itself from the fishhook by opening its mouth;

FIG. 5 is a perspective view of the fishhook of FIG. 1 resting on the bottom of a lake or stream bed illustrating the resistance of the fishhook to snagging on rocks and the like;

FIG. 6 is a perspective view of an alternative three hook embodiment fishhook in accordance with the invention, shown hooked to a fish; and FIG. 7 is a perspective view of yet another novel fishhook having four hooks, shown hooked to a fish.

DETAILED DESCRIPTION OF A PREFERRED EMBODIMENT

In compliance with the constitutional purpose of the Patent Laws "to promote the progress of science and useful arts" (Article 1, Section 8), the following disclosure of the invention is submitted.

FIG. 1 shows a preferred embodiment fishhook apparatus 10 according to this invention. Fishhook 10 includes two elongate members or shanks 12 having hooks 14 integrally formed or connected at distal ends of the elongate members. Proximate ends 12a of members 12 are either connected together or integrally formed. As shown, the two elongate members 12 preferably comprise a single piece of spring wire having at least one loop 16 integrally formed therein. Loop 16 advantageously forms a spring which biases members 12 into angularly separated extended positions. In such extended positions hooks 14 are separated and oppositely oriented in an opposed relationship. Loop 16 also functions as a means for connecting a fishing line 50 or other tackle such as a swivel (not shown) to hook 10. Fishhook apparatus 10 can alternatively be formed using two separate pieces of wire-like material connected to a ring-like member (not shown) serving as an alternative line-connection element in lieu of loop 16.

Fishhook apparatus 10 further comprises a contraction linkage 18. Contraction linkage 18 serves to contract elongate members 12 and hooks 14 inwardly so that hooks 14 engage outer portions of a fish 24 along its snout. Contraction linkage 18 advantageously is constructed using a single spring wire 20. Wire 20 is preferably connected to medial portions of elongate members 12 between hooks 14 and proximate ends 12a at locations 28. Wire 20 can be connected to the elongate members by welding, soldering, forging, integral molding or other suitable connection means. Contraction linkage 18 also serves to maintain hooks 14 in a spaced apart relationship until contracted by a striking fish as explained below.

The contraction linkage is adapted for connecting an appropriate fish bait thereto. The term fish bait as used herein includes any device used as an attraction for fish such as a lure, hook, live bait, worms or other device which will cause the fish to strike. Single or multiple loops 22 are preferably integrally formed in wire 20 intermediate its ends for this purpose. Loop 22 is preferably centered between elongate members 12 and associated inwardly directed outer or exterior hooks 14. An appropriate swivel and bait hook, 24, 26, respectively, or other fish lure is connected to loop 22 to define the point of the fishhook apparatus to which a fish is to be attracted. A fish striking bait hook 26 will cause spring wire 20 to bend and thus contract members 12 and hooks 14 inwardly to engage the fish as illustrated in FIG. 3.

Elongate members 12 are preferably biased into extended positions relative to one another. The means for biasing the elongate members can take on a number of independent or coperating forms. For example, integrally formed loop 16 can be formed to act as a spring and bias elongate members 12 angularly apart from one another. Contraction linkage 18 can alternatively or additionally act as a flexible or contractible strut to bias elongate members 12 outwardly. The outward biasing is important to separate external hooks 14 from one another and provide ample room for a fish to easily access and pull upon bait connected to contraction means 18.

Alternative fishhooks according to this invention are shown in FIGS. 6 and 7. FIG. 6 shows a fishhook apparatus 110 having three elongate members 112 and assocaited fishhooks 114 connected at distal ends thereof. Fishook 110 uses a solid ring 116 to which are connected the proximate ends of elongated shanks 112. A contraction linkage 120 is connected to central portions of elongate members 112 using three links 121. Links 121 are joined together at a ring 122 which services to integrally connect the links and act as a means for connecting a bait hook 123 or other bait to contraction linkage 120. FIG. 7 shows a fishhook 210 having four elongate members 212 and associated hooks 214 formed at distal ends thereof. A contraction linkage 220 includes four spring wire links 221 which extend from each elongate member to a central ring 222 for securing a bait hook or other lure thereto. The proximal ends of elongate members 112, 212 are interconnected to ring member 216 for connecting to fish line 50.

Operation of the fishhook will be best understood by referring to FIGS. 2-4. Hook apparatus 10 is first arranged into the extended position of FIG. 2 by manual manipulation if needed due to deformation from a previous fish strike. An appropriate bait 30 is then secured to bait hook 26. A fish 32 approaches the baited bait hook 26 free of interference from exterior hooks 14 because of their spaced apart relationship in the extended position. A fish striking bait hook 26 pulls on the bait hook and associated wire 20. Wire 20 is adapted to easily flex at loop 22 causing elongate members 12 and associated hooks 14 to contract inwardly as shown in FIG. 3. Hooks 14 pierce the soft tissue behind the fish's lips, thus becoming positively engaged or hooked to outer surfaces of the fish. External hooks 14 are shown with barbs 14a to maintain the exterior hooks in position. As best illustrated in FIG. 4, should the fish be able to free itself from bait hook 26 by opening its mouth, hooks 14 will still remain engaged in the soft tissue behind the lip preventing the fish from escaping.

Fish are prevented from swallowing the fishhooks of this invention due to the size of the apparatus when hooks 14 are spaced apart, and due to the engagement of exterior hooks 14 against external surfaces of the fish when in the contracted position of FIG. 3. It is very easy for the fisherman to disengage the hook from the fish's mouth as the hooks 14 and bait hook 26 are engaged very near the opening of the fish mouth. The hooks of the present invention have the additional advantage of more positively engaging a fish than prior art hooks. This makes it less likely that a fish can free itself from the hook until released by the fisherman.

Fishhooks of this invention are also inherently resistant to snagging on rock, logs, weeds and other debris. FIGS. 5-7 in particular illustrate that the overall tapered shape of fishhooks 10, 110, and 210, combined with the inwardly directed exterior hooks, provide a fishhook free of prings, tips or other parts which tend to snag.

In compliance with the statute, the invention has been described in language more or less specific as to structural features. It is to be understood, however, that the invention is not limited to the specific features shown, since the means and construction herein disclosed comprise a preferred form of putting the invention into effect. The invention is, therefore, claimed in any of its forms or modifications within the proper scope of the appended claims, appropriately interpreted in accordance with the doctrine of equivalents.

What is claimed is:

1. A fishook apparatus for hooking fish and the like, comprising:

three elongate members having distal and proximate ends, the elongate members being connected to at least one other elongate member at proximate ends thereof; each of said elongate members being provided with at least one external hook means connected to at least one of the elongate members near the distal end thereof, said external hook means being inwardly directed;

contraction linkage means connected to and extending between at least two of the elongate members for causing inward contraction of the elongate members and associated external hook means toward one another upon engagement of the linkage means by a fish striking at the fishook apparatus, the contraction linkage means being adapted for connecting in appropriate fish bait thereto; wherein the contraction linkage means comprises three link members, each being metallurgically connected to an elongate member at a point intermediate ends of the elongate member, the three link members being joined at a juncture positioned between the elongate members, said juncture being adapted to connect an appropriate fish bait thereto; and biasing means for biasing the external hook means into extended positions wherein the external hook means are spaced apart.

2. A fishook apparatus for hooking fish and the like, comprising:

four elongate members having distal and proximate ends, the elongate members being connected to at least one other elongate member at proximate ends thereof; each of said elongate members being provided with at least one external hook means connected to at least one of the elongate members near the distal end thereof, said external hook means being inwardly directed;

contraction linkage means connected to and extending between at least two of the elongate members for causing inward contraction of the elongate members and associated external hook means toward one another upon engagement of the linkage means by a fish striking at the fishook apparatus, the contraction linkage means being adapted for connecting an appropriate fish bait thereto;

wherein the contraction linkage means comprises four link members, each being metallurgically connected to an elongate member at a point intermediate the ends of the elongate member, each of the four link members being joined at a juncture positioned between the elongate members, said juncture being adapted to connect an appropriate fish bait thereto; and biasing means for biasing the external hook means into extended positions wherein the external hook means are spaced apart.

* * * * *